Patented Oct. 18, 1949

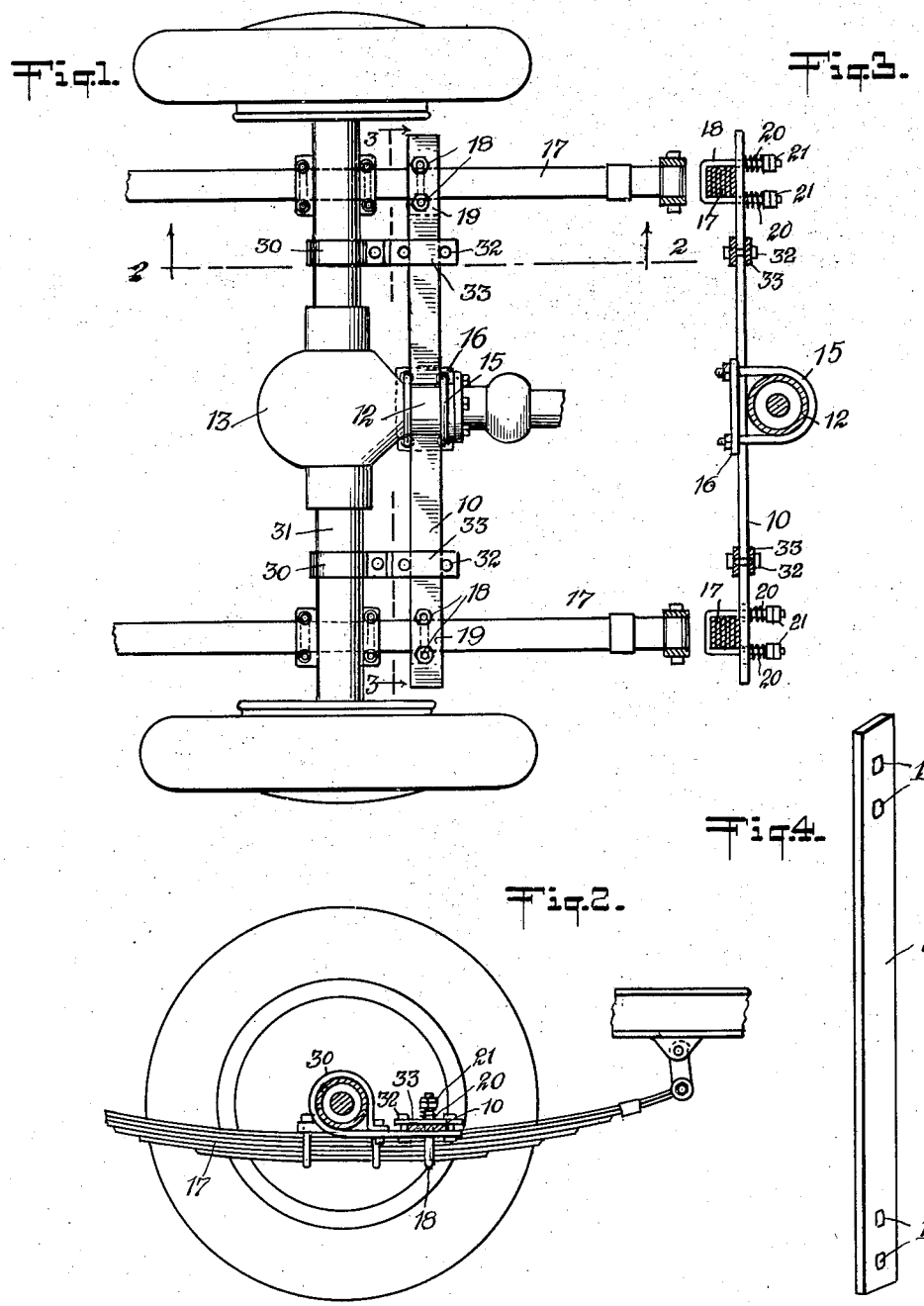

2,485,434

UNITED STATES PATENT OFFICE 2,485,434

VEHICLE REAR AXLE HOUSING SUPPORT

Charles Cynamon and Edward A. Cynamon,
New York, N. Y.

Application May 7, 1947, Serial No. 746,590

7 Claims. (Cl. 180—88)

This invention relates to supports for the rear ends of automobiles and motor trucks.

The principal object of this invention is the provision of means for supporting the rear end of automobiles and motor trucks and preventing buckling thereof when the vehicle is started suddenly or when it is operating under a severe load.

It is a well-known fact that the forwardly extending portion of rear end housings is caused to move upwardly or downwardly in response to suddenly increased or decreased torque in the transmission shaft. This upward or downward movement is wholly undesirable, since it weakens the entire transmission structure and mechanism. The present invention comprises means for eliminating or at least greatly reducing such upward and downward movement. It also comprises means for preventing or reducing side sway on turns, and in addition it tends to prevent the vehicle from overturning on sharp curves taken at excess speeds.

Another object of this invention is the provision of means for preventing excessive bounding and rebounding of the spring structure which is connected to the rear axle of the vehicle.

A further object of this invention is the provision of a stabilizer which minimizes or subdues the vibratory effects in the chassis and body of vehicles which encounter rough and uneven road conditions.

A preferred embodiment of this invention is shown in the accompanying drawing in which:

Fig. 1 is a top view thereof showing how it is mounted on the rear end of an automobile having conventional leaf springs;

Fig. 2 is a section on the line 2—2 of Fig. 1;

Fig. 3 is a section on the line 3—3 of Fig. 1; and

Fig. 4 is a perspective view of the stabilizing bar which comprises the principal element of the present invention.

Referring particularly to Fig. 4, it will be seen that the present invention includes as its principal component part a stabilizing bar 10 which is provided with a pair of holes 11 at each end. This bar is made of relatively rigid inflexible steel alloy, and it is connected to the forward end 12 of the rear end housing 13 by means of U-shaped clamps 15. It is of course well known that the complete housing for the entire rear end comprises the large globular portion 13, housing the differential bevel gears and the extending neck or forward portion 12 housing the pinion, and these two portions comprise the complete housing for the entire rear end unit which includes the pinion. Two such clamps are used and they are connected to each other by means of an apertured plate 16 which extends underneath bar 10. It will be noted that bar 10 extends underneath the forward end of the rear end housing, and that it extends transversely of the vehicle chassis, and that its end portions rest upon the top leaf of leaf springs 17. The ends of bar 10 are attached to springs 17 by means of U-bolts 18 which embrace springs 17 and extend upwardly through holes 11 in said bar 10. Strong compression springs 20 are mounted on each arm of U-shaped bolts 18, and they are locked in place by means of nuts 21. It will be seen particularly in Fig. 3 that a strong, yet resilient, connection is thereby provided between the ends of stabilizing bar 10 and the leaf springs 17. In most cases, the bar 10 is connected as shown, at the extreme forward end of the portion of the housing inclosing the pinion regardless of how long that neck or housing portion is. This will therefore, dispose the bar in a line parallel to the line of the rear axle but spaced at least eight or ten inches forward of said line.

A pair of straps 30 is provided to further fix the position of stabilizing bar 10 relative to the rear axle casings 31 of the vehicle. These straps are mounted on the axle housing between the rear end 13 and the springs 17. It will be noted in Fig. 2 that each strap 30 is provided with a loop-shaped end which engages the axle casings 31. The opposite and forward end of strap 30 is bolted to the stabilizing bar 10 by means of bolts 32 and plate 33.

It will be understood that the foregoing is a description of one embodiment only of the present invention, and that this embodiment may be modified in accordance with the specific requirements of the different types of vehicle to which it may be applied. For example, in such vehicles where the rear leaf springs are mounted on top of the rear axle rather than underneath, as shown in the drawing, it may be necessary to affix the stabilizing bar to the top of the forward portion of the rear end housing rather than to the bottom as shown in the drawing. In some vehicles it may be necessary to provide a slight bend in the stabilizing bar so that appropriate connections between the bar and the rear end housing on the one hand, and between the bar and the rear springs on the other hand, may be made.

We claim:

1. In a vehicle, a rear end housing and axle casings extending from each side of said rear end housing, rear springs connected to the axle casings, a support which includes a relatively rigid bar connected at both ends to the rear springs of the vehicle and at its center to the rear end housing.

2. In a vehicle, a rear end housing and axle casings extending from each side of said rear end housing, rear springs connected to the axle casings, a support which includes a relatively rigid bar which extends transversely of the chassis and which is connected at both ends to the springs and intermediate its ends to a forward portion of the rear end housing.

3. In a vehicle, a rear end housing and axle casings extending from each side of said rear end housings, rear springs connected to the axle casings, a supporting and stabilizing means which includes a relatively rigid bar, which is clamped at its center portion to a forward end of the rear end housing, clamps connecting the ends of said bar to the springs and springs associated with said clamps and said bar to connect it under regulated tension.

4. In a vehicle, a rear end housing and axle casings extending from each side of said rear end housing, rear leaf springs extending longitudinally of the vehicle and connected to the axle casings, a supporting and stabilizing means which includes a relatively rigid bar which extends parallel to the rear axle casings, said bar being clamped to a forward end of the rear end housing, U-shaped clamps connecting the ends of said bar to the leaf springs, and spring means associated with said clamps and said bar to hold it under tension.

5. In a vehicle, a rear end housing and axle casings extending from each side of said rear end housing, longitudinally extending rear leaf springs connected to said axle casings, a supporting and stabilizing means including a relatively rigid bar which extends parallel to the axle casings and connected at its center to a forward portion of the rear end housing, U-shaped clamps connecting the ends of said bar to the leaf springs, spring means associated with said bar and clamps to maintain a spring tension therebetween, and straps looped around the axle casings and bolted to said bar between the rear end housing and the leaf springs.

6. A device in accordance with claim 4, in which the rigid bar is provided at each end with a pair of holes through which the U-shaped clamps are adapted to extend.

7. A device in accordance with claim 4, in which the bar is bolted to the forward end of the rear end housing by means of U-shaped bolts encircling said forward end.

CHARLES CYNAMON.
EDWARD A. CYNAMON.

REFERENCES CITED

The following references are of record in the file of this patent:

UNITED STATES PATENTS

| Number | Name | Date |
|---|---|---|
| 1,024,652 | Royce | Apr. 30, 1912 |
| 1,293,796 | Kenrick | Feb. 11, 1919 |
| 1,759,370 | Rhodin | May 20, 1930 |